United States Patent [19]

Merchel

[11] Patent Number: 6,102,288
[45] Date of Patent: Aug. 15, 2000

[54] CARD FOR A PLEDGE LOCK

[75] Inventor: Horst Merchel, Bietigheim-Bissingen, Germany

[73] Assignee: Vendoret Holding S. A., Luxembourg-Hesperange, Luxembourg

[21] Appl. No.: 08/254,575

[22] Filed: Jun. 6, 1994

[30] Foreign Application Priority Data

Jun. 4, 1993 [DE] Germany .............................. 43 18 627
Dec. 8, 1993 [DE] Germany .............................. 43 41 792

[51] Int. Cl.⁷ ................................................. G06K 15/00
[52] U.S. Cl. ........................................... 235/383; 235/382
[58] Field of Search .................................. 235/382, 382.5, 235/383, 493; 186/26, 27; 70/387, 345

[56] References Cited

U.S. PATENT DOCUMENTS

| | | | |
|---|---|---|---|
| 3,505,841 | 4/1970 | Sinclair | 70/350 |
| 3,629,834 | 12/1971 | Randall | 235/382 |
| 3,790,754 | 2/1974 | Black | 235/382 |
| 3,906,447 | 9/1975 | Crafton | 235/382.5 |
| 4,519,228 | 5/1985 | Sornes | 235/382.5 |
| 4,527,052 | 7/1985 | Kilborn | 235/485 |
| 4,593,185 | 6/1986 | Patzelt | 235/382 |
| 4,602,150 | 7/1986 | Nishikawa | 235/382 |
| 4,627,252 | 12/1986 | Lo | 70/351 |
| 4,686,358 | 8/1987 | Seckinger | 235/382 |
| 4,937,437 | 6/1990 | Ferguson | 235/382 |
| 5,043,562 | 8/1991 | Hautvast | 235/440 |
| 5,045,674 | 9/1991 | Mita | 235/439 |
| 5,069,324 | 12/1991 | Lepage | 194/212 |
| 5,146,770 | 9/1992 | Yun-Sheng | 70/38 C |

FOREIGN PATENT DOCUMENTS

| | | |
|---|---|---|
| 2 597 140 | 4/1986 | France . |
| 2 629 122 | 3/1988 | France . |
| 1 952 612 | 10/1969 | Germany . |
| 34 42 045 | 5/1984 | Germany . |
| 0 545 233 | 11/1992 | Germany . |
| 42 10 149 | 9/1993 | Germany . |
| 959713 | 6/1964 | United Kingdom . |

OTHER PUBLICATIONS

Science & Vie, (1991) Mai, No. 884, Paris, France p 126.
IBM Technical Disclosure Bulletin, vol. 24, No. 7B, Dec. 1981—Asymmetrical Card p 3882.

*Primary Examiner*—Karl Frech
*Attorney, Agent, or Firm*—Herbert Dubno; Andrew Wilford

[57] ABSTRACT

The invention relates to a pledge lock for shopping trolleys and luggage trolleys, to be releasably attached to one another, the lock having a casing 1 attached to the first trolley and formed with an opening 1b for a pledge and an opening 1a for a coupling member, which is attached to the second trolley and kept locked by a closure bolt until the pledge has been inserted, the pledge being a card which during insertion moves a control member 3 which moves the closure bolt 4 out of the locking and into the unlocked position, the card having at least a first zone which can be bent out of the plane of the card in relation to the remaining, second card zone by a lock projection 14 extending into the card insertion path, said first zone when in the bent-out state impinging directly or via an intermediate member against a stop 3d of the control member, in order to move the control member.

9 Claims, 8 Drawing Sheets

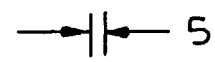
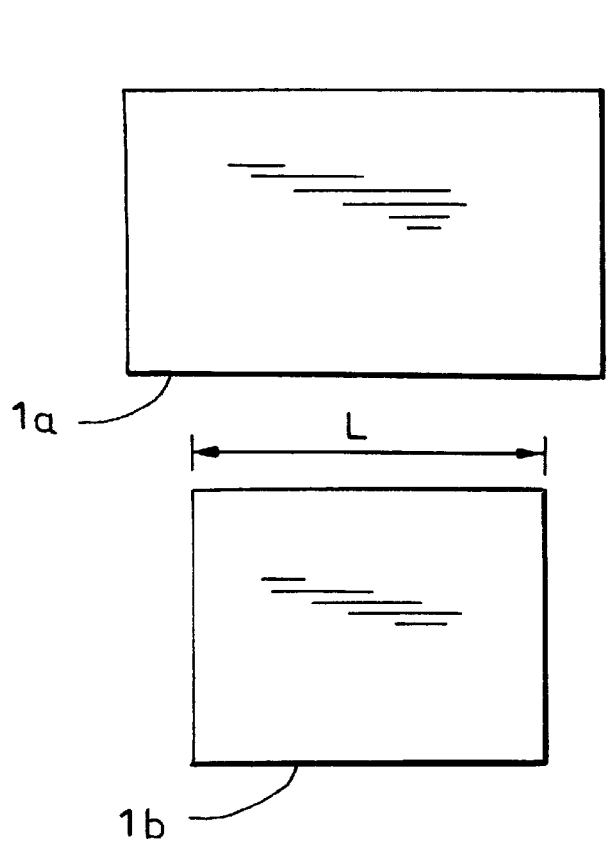
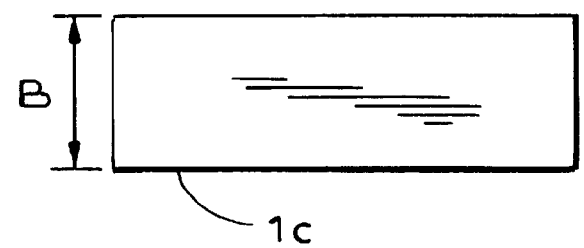
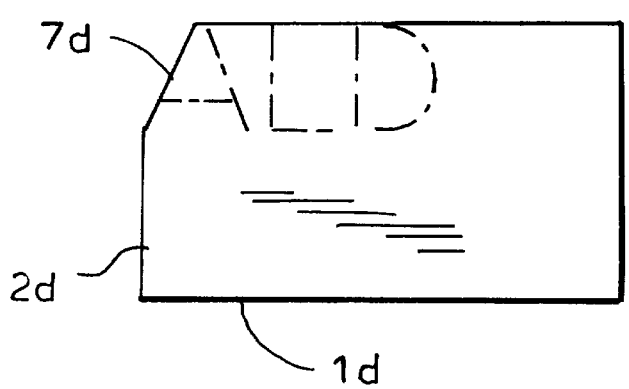

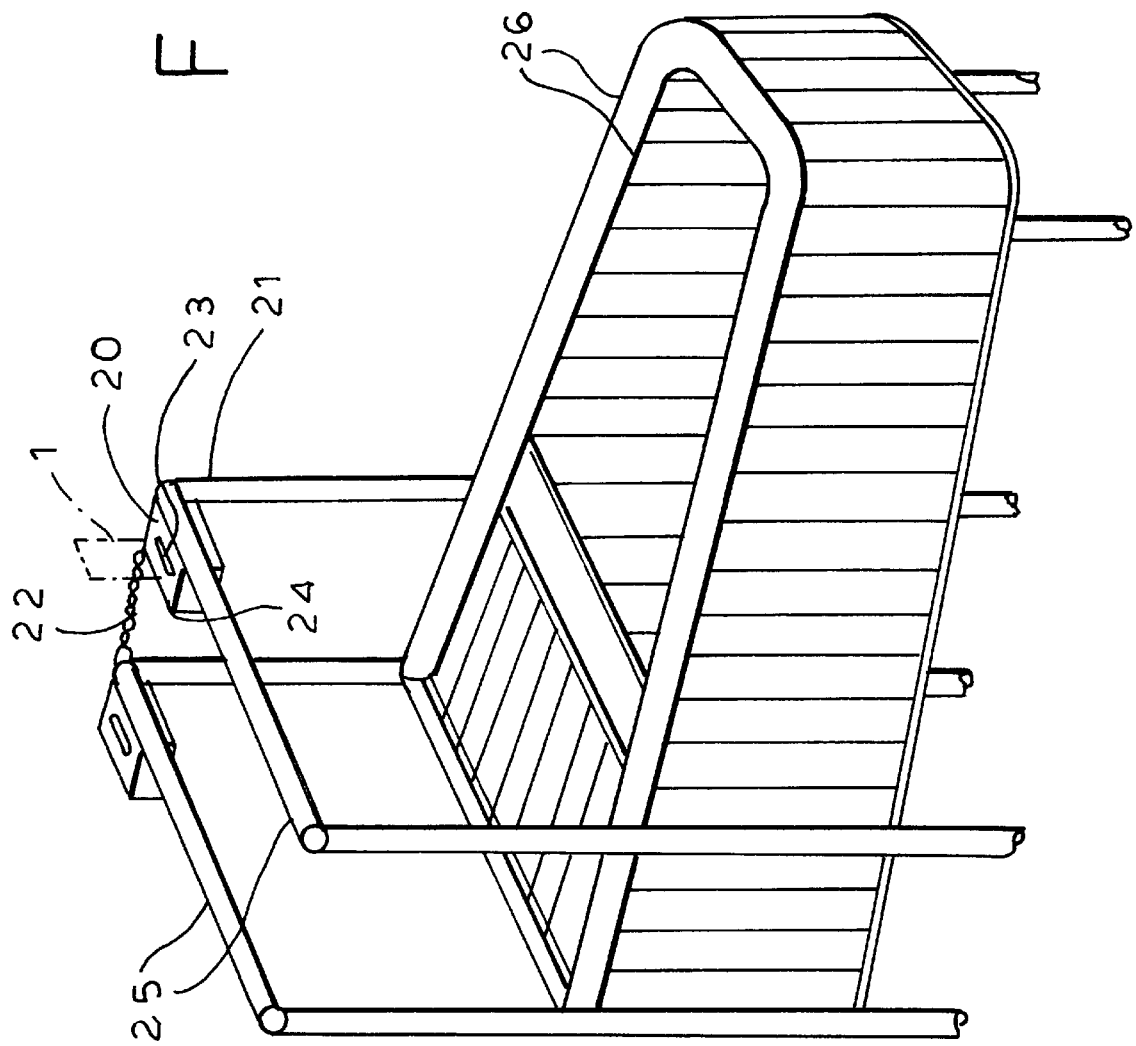

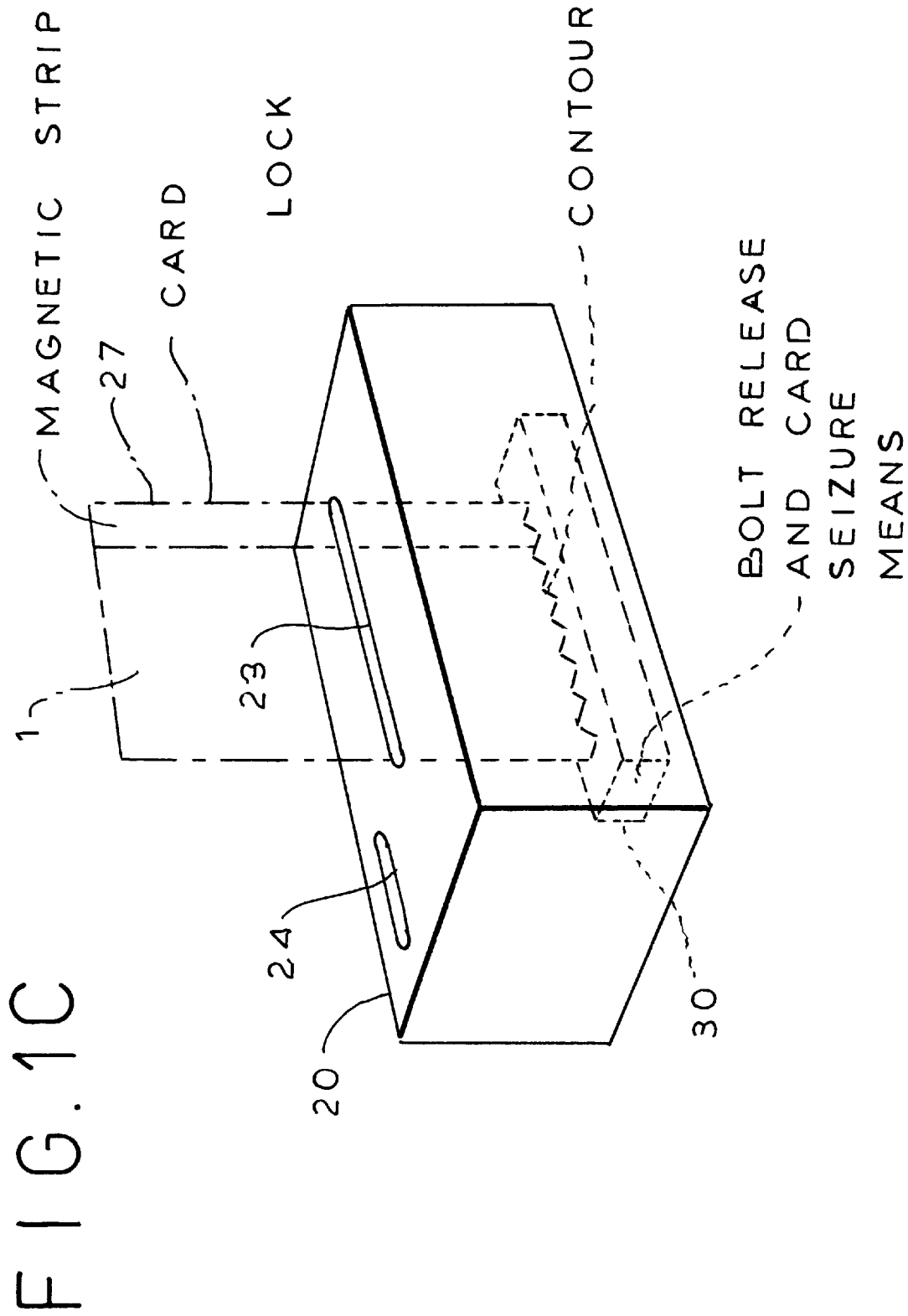

CARD FOR A PLEDGE LOCK

SPECIFICATION

Field of the Invention

The invention relates to a card for a pledge lock for shopping trolleys or luggage trolleys to be releasably attached to one another.

BACKGROUND OF THE INVENTION

A card for a pledge lock is disclosed in German Patent document, which was previously applied for and was a later. An important aspect thereof is that the lock does not accept just any card, but the coupling member can be unlocked only by certain cards.

OBJECT OF THE INVENTION

It is an object of the invention so to improve a pledge lock of the kind specified that the coupling member can be unlocked due to the particular shape or design of the simply constructed card.

This problem is solved according to the invention by the feature that the card surface and/or the card edge has at least one widened portion, more particularly a projection, and/or at least one reduced portion, more particularly a recess, via which the lock can be actuated and/or the card can be checked.

Due to the widened portion and/or reduced portion in a particular small or large zone of the card, the lock can be actuated only by a card designed in this manner. On the one hand, the deformed or undeformed zone can unlock the coupling member directly or via intermediate members. On the other hand it can also be done by the insertion of only a correctly constructed card into the lock, such insertability first making unlocking possible. At the same time the lock and card are very simply constructed and have small outside dimensions. Moreover, other results are high functional efficiency and security and simple handling.

BRIEF DESCRIPTION OF THE DRAWING

The above and other objects, features, and advantages will become more readily apparent from the following description, reference being made to the accompanying drawing in which:

FIG. 1 is an elevational view of a card of greater thickness;

FIG. 1A is an end view of the card of FIG. 1;

FIG. 1B is a partial small-scale view of a pair of shopping carts equipped with the lock system of this invention;

FIG. 1C is a mainly diagrammatic view of the pledge lock of the present invention;

FIG. 2 is an elevational view of a card of smaller length;

FIG. 3 is an elevational view of a card of smaller width;

FIG. 4 is an elevational view of a card having a chamfered corner;

SPECIFIC DESCRIPTION

Figure 5:
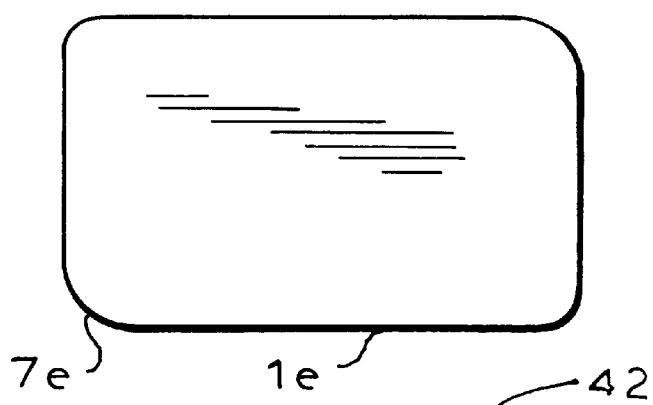
FIG. 5 is an elevational view of card having two strongly rounded corners.

As seen in FIGS. 1B and 1C a pledge lock 20 has a casing whose side wall is formed with a slot 23 into which a card 1 carrying a magnetic strip 27 can be inserted as a pledge. In addition to the slot 23 for the card 1, a further slot 24 can be provided via which a coin can alternatively be inserted as a pledge.

The insertion of a suitable card 1 moves a control member which unlocks a closure bolt which releases a coupling member 22 off an adjacent shopping trolley 26. As soon therefore as the card 1 has been inserted into the lock 20 of the first trolley 26, the coupling member 22 of the adjacent trolley 26 is released and the trolley 26 can be removed. The lock 20 is attached as described in copending application Ser. No. 08/254,294 to a crosspiece 25 bridging uprights 21 and can also be attached either to the handle of the shopping trolley 26, to a handle strut, or to the trolley basket.

A pledge lock (not shown) has a casing whose side wall is formed with a slot into which a card 1 can be inserted as a pledge. In addition to the slot for the card, a further slot can be provided via which a coin can alternatively be inserted as a pledge.

The insertion of a suitable card moves a control member which unlocks a closure bolt, which releases a coupling member of an adjacent shopping trolley. As soon, therefore, as the card has been inserted into the lock of the first trolley, the coupling member of the adjacent trolley is released, and the trolley can be removed. The precise construction and function of the lock is disclosed as an embodiment in German Patent document 43 18 627 (see copending application Ser. No. 08/254,294). The lock is attached either to the handle of a shopping trolley, to a handle strut or to the trolley basket.

The various embodiments of the card disclosed hereinafter optionally perform two different functions.

In a first embodiment the card is so shaped that it can be inserted or inserted deeply enough into the slot only if the car is correctly constructed, the lock of the coupling member being released by insertion or sufficiently deep insertion into the lock.

In a second application, the special construction of the card is not intended to impede its insertion. On the contrary, even a wrong card can be completely inserted. However, the wrong card does not release the locking—i.e., the lock is released, and therefore the coupling member can be unlocked, only by the card having the correct design with the special correct card construction, for example, with a projection disposed at the correct place on the card.

All the card constructions or designs disclosed hereinafter can always perform either the one function or the other. Moreover, care must be taken that a card inserted into the lock is firmly retained therein after the unlocking of the coupling member. Additional constructions, for example, operations in the card, can be provided for this purpose. In many cases even the special type of construction of the card is enough to ensure that the card is firmly retained by means 30 (FIG. 1B) in the lock, until a coupling member of a second trolley is again inserted in the lock.

The various card constructions will be disclosed individually hereinafter; two or more kinds of construction can also be provided on a single card:

The card 1a (FIG. 1) has a thickness S which is thinner or thicker than an ordinary credit or telephone card, the card thickness being scanned in the lock and only a card of the correct thickness being accepted by the lock. In the case of a thinner card than usual, this can be done merely by constructing the slot in the lock so thin that cards of ordinary thickness cannot be inserted. In the case of a card substantially thicker than the known cards, the scanning or checking can be done by the card due to its thickness merely actuating a pin or pusher or lever extending into its path, while a thinner card does not reach this member to be moved.

In the embodiment illustrated in FIG. 2 a card 1b has a smaller length L than usual, so that only this short card can be inserted by its outer side deeply enough into the lock to actuate a lever disposed adjacent the lock slot. Alternatively, however, the card can also be substantially longer than the usual card, so that only such a long card can enter the lock deeply enough to actuate the triggering mechanism.

In the embodiment illustrated in FIG. 3 the card 1c is narrower than usual, the slot also having a corresponding width, so that only a very narrow card can be inserted. Alternatively, the card can be substantially wider and reach the triggering mechanism solely due to its greater width, a detent being preferably provided on both sides of the lock introduction shaft.

In the embodiment illustrated in FIG. 4 the front edge 2d of the card 1d has a chamfer 7d which bears against a matching member in the introduction shaft, so that only a card having such a chamfer can be inserted deeply enough into the lock, the front, unchamfered edge 2d releasing the lock only with such a deep insertion.

A similar construction is also shown by the card 1e illustrated in FIG. 5. In this case the card has a rounded portion 7e whose radius is larger than customary rounded portions, the card again being insertable sufficiently deeply into the lock introduction shaft only if the matching member corresponding to the rounded portion bears thereagainst, so that the card can be deeply enough inserted.

Figure 6:
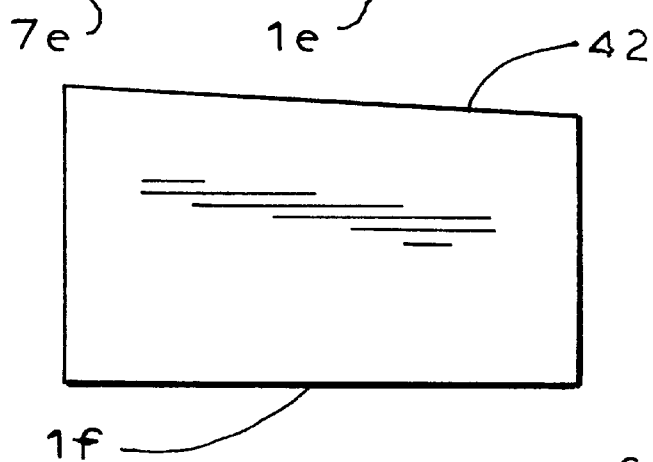
FIG. 6 is an elevational view of a card having an oblique longitudinal side.

The embodiment illustrated in FIG. 6 has an oblique longitudinal edge 4f; again, the card 1f can be inserted deeply enough into the lock only if this oblique edge is present. In contrast, any card not having this oblique edge will become jammed after being inserted by a few centimeters.

Figure 7:
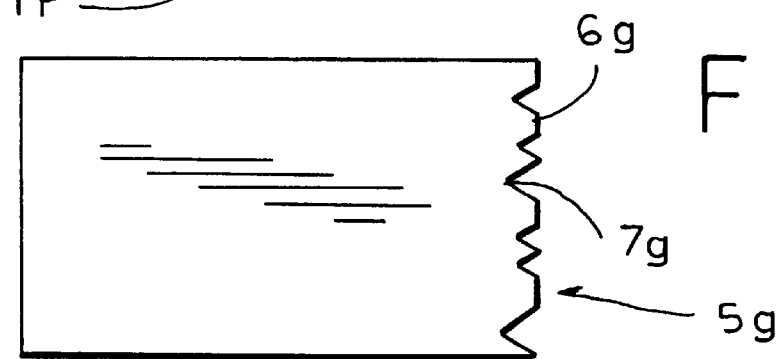
FIG. 7 is an elevational view of a card having a front-edge contour.
Figure 8:
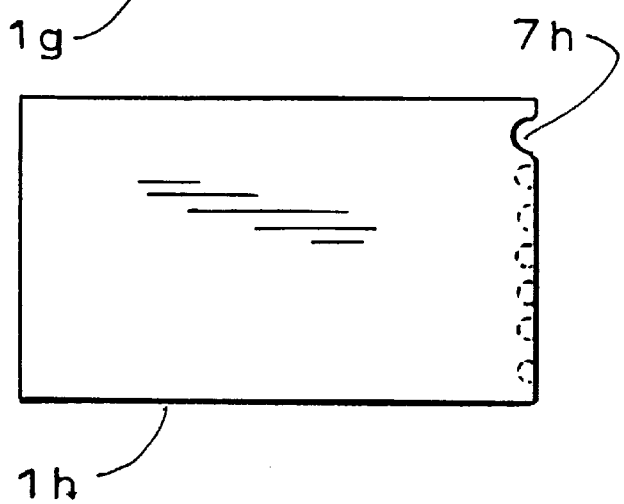
FIG. 8 is an elevational view of card with a front-edge perforation.
Figure 9:
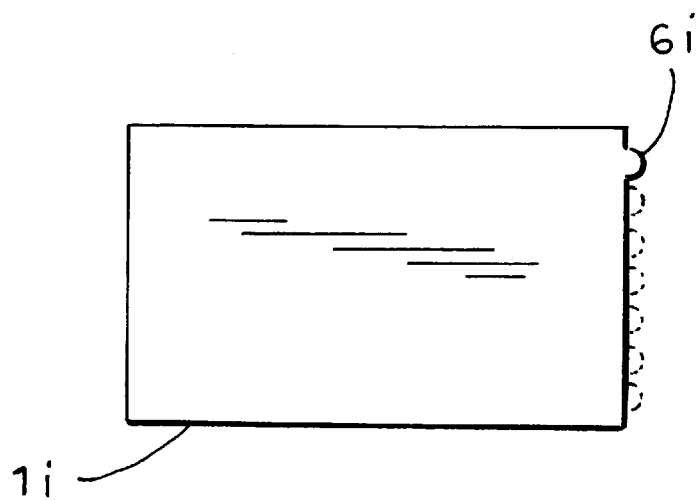
FIG. 9 is an elevational view of a card with front-edge projections.

In the embodiment illustrated in FIG. 7 the front edge 5g of the card 1g has a profiling with widened portions or projections 6g and reduced portions or recesses 7g, so that this front profiling of contour or front edge of the card must fit a matching member in the lock which is accordingly shaped oppositely. As a result, only a card having this special contour can be fitted far enough in to the lock, which can be released only as a result of this sufficiently deep insertion of the card.

The embodiments illustrated in FIGS. 8 to 11 also operate in the same manner. The card 1h shown in FIG. 8 has punched-out portions or marginal perforations 7h which open in the outward direction and extend into matching members or projections in the lock. The card 1i shown in FIG. 9 operates conversely. The front side has raised portions 6i which extend into corresponding recesses at the end of an introduction shaft in the lock. As was also the case with the embodiment illustrated in FIG. 7, in all the embodiments shown in FIGS. 7 to 11 a large number of alternative shapes can be created, as with a key bit.

Figure 10:
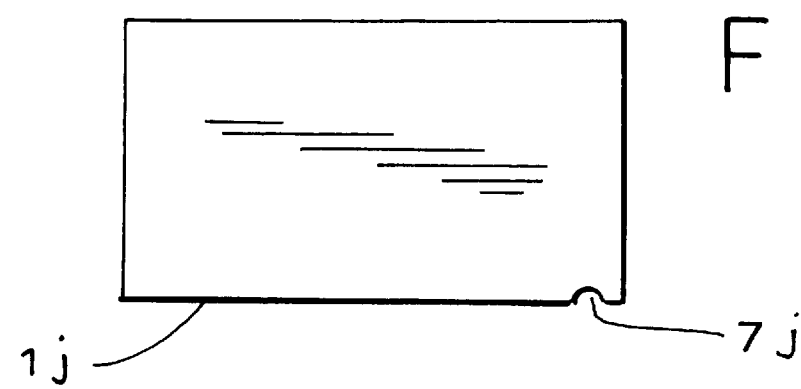
FIG. 10 is an elevational view of a card with a perforated longitudinal edge.
Figure 11:
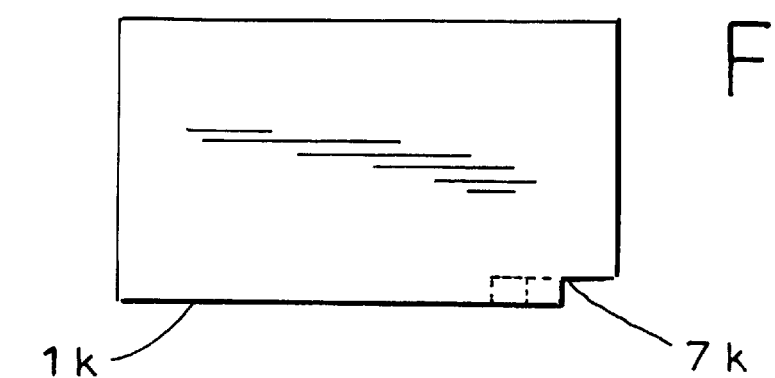
FIG. 11 is an elevational view of a card with cut backs on a longitudinal edge.

In the embodiment illustrated in FIG. 10 the recesses or projections 7j are provided on the longitudinal side of a card 1j. Correspondingly, the lock has at least on one side of the introduction shaft a scanning pin, scanning lever or other scanning instrument which extends into one or more recesses, the coupling member being released only when this takes place. In the embodiment illustrated in FIG. 11 the recesses 7k of the card 1k are not semi-circular, but rectangular.

Figure 12:
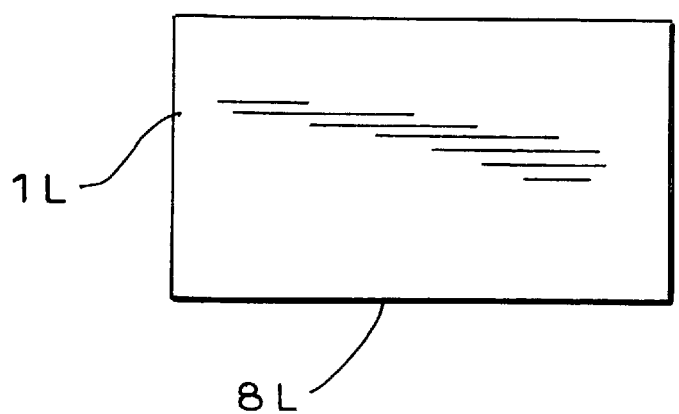
FIG. 12 is an elevational view of a card with a rough longitudinal edge.

The embodiment illustrated in FIG. 12 has a longitudinal edge which forms a rough side contour 8l. Inside the lock the side contour runs down a wheel or drum or cylinder, so that when the card 1l is inserted the friction roller is rotated, thereby making unbolting possible.

Figure 15:
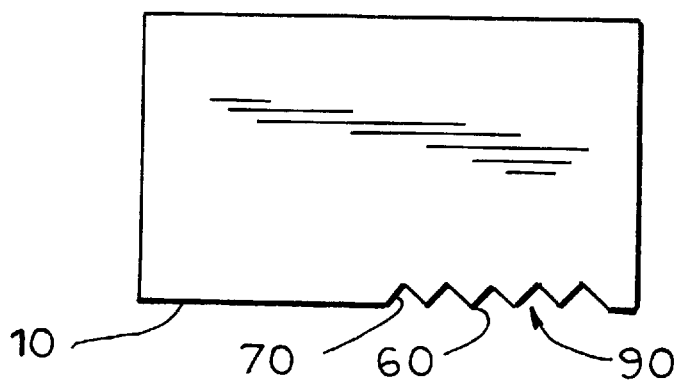
FIG. 15 is an elevational view of a card with a toothing on a longitudinal edge.

Instead of such a rough contour, however, the longitudinal side 9o of the card 1o can also have a kind of toothing 6o, 7o, as shown in FIG. 15. The toothing moves a toothed wheel inside the lock for unlocking purposes.

Figure 16:
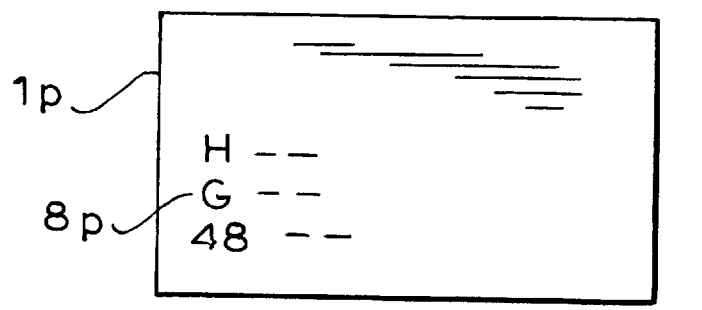
FIG. 16 is an elevational view of a card with an embossed inscription.
Figure 17:
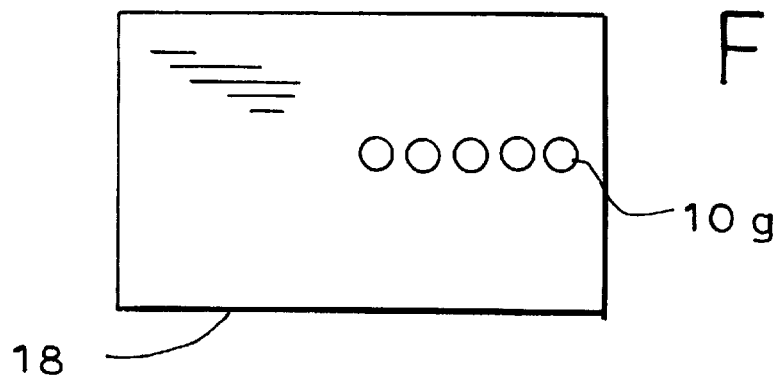
FIG. 17 is an elevational view of a card with a row of holes in a side face.
Figure 18:
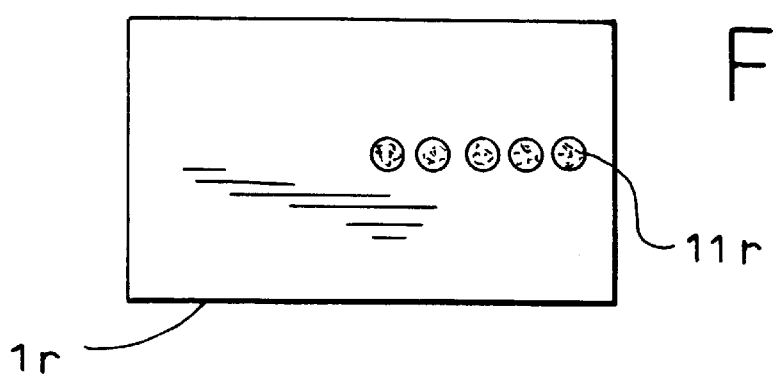
FIG. 18 is an elevational view of a card with a row of depressions in a side face.
Figure 19:
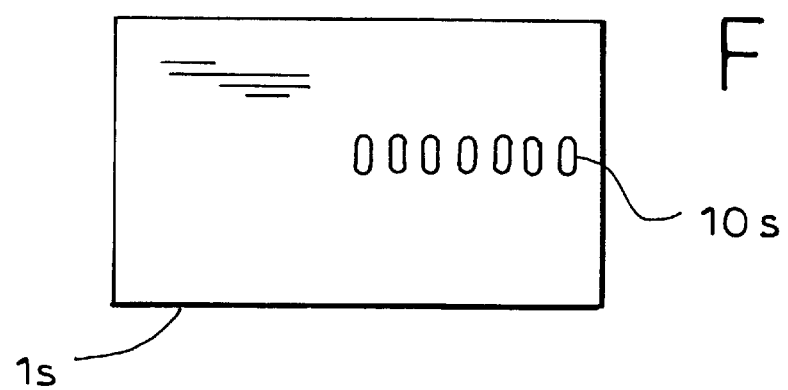
FIG. 19 is an elevational view of a card with a row of rectangular holes in a side face.
Figure 20:
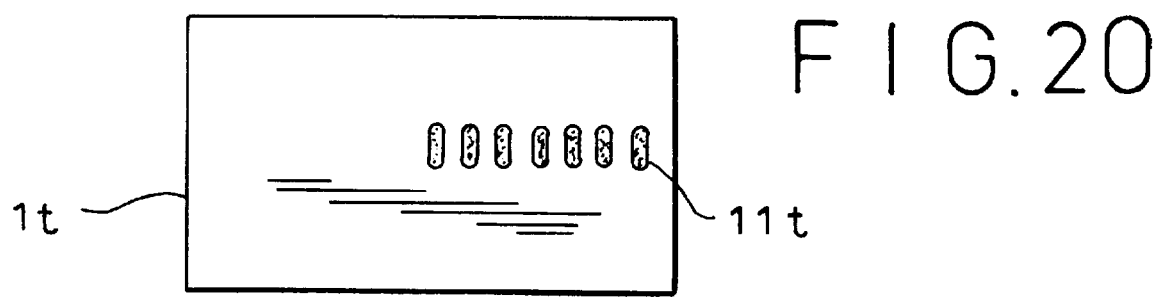
FIG. 20 is an elevational view of a card with a row of elongated depressions in a side face.

In a similar way, at least one side face of the card 1p can also have a roughening, for example, in the form of an embossed inscription 8p, as shown in FIG. 16. This inscription also can cause a friction roller in the lock to rotate, to produce unlocking.

The embodiments illustrated in FIGS. 13, 14 and 17 to 20 show recesses in the form of openings 11 or depressions 11 of different shapes, number and size. However, they share the feature that, similarly to what was disclosed hereinbefore, they serve for scanning, either to release the lock or to confirm the correctness of the card, so that only a correct card can be inserted far enough to produce release.

Figure 13:
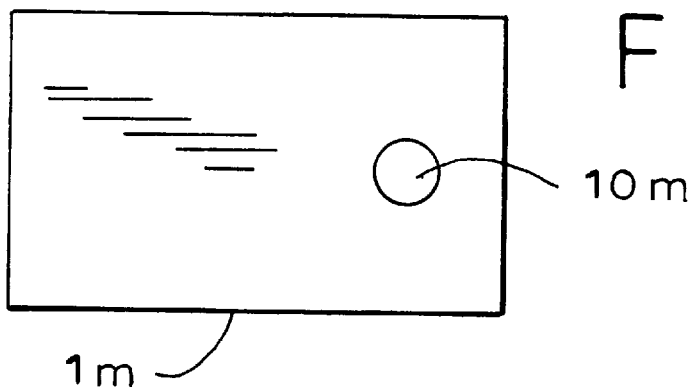
FIG. 13 is an elevational view of a card with an opening (hole) in a side face.
Figure 14:
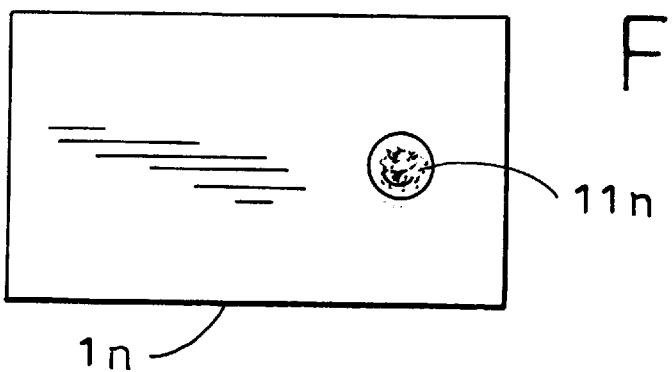
FIG. 14 is an elevational view of a card with a raised or depressed portion in a side face.

In the embodiment illustrated in FIG. 13 only one opening 10m and in that illustrated in FIG. 14 only one depression 11n is provided of the respective cards 1m and 1n. The card 1q illustrated in FIG. 17 has a number of depressions in a row; the card 1r shown in FIG. 18 has a number of depressions 11r in a row; and in the card 1s and 1t illustrated in FIGS. 19 and 20 the apertures 10s and depressions 11t are elongate in shape.

Figure 21:
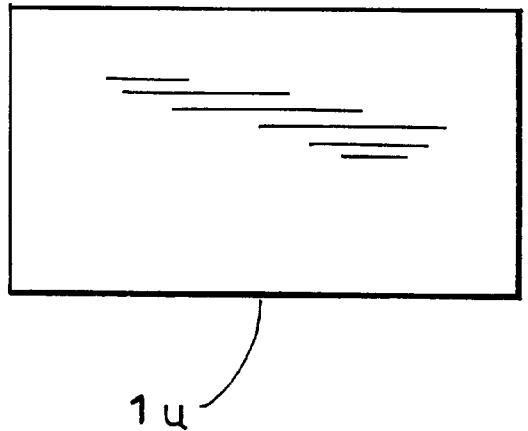
FIG. 21 is an elevational view of a card with shaped longitudinal edges.
Figure 21A:
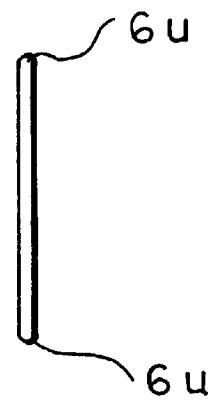
FIG. 21A is an end view of the card of FIG. 21.

In the embodiment illustrated in FIG. 21 and 21A the card 1u has at its longitudinal sides a cross-sectional contour 16u which can be either half-round or quarter-round and which fits positively in a correspondingly shaped scanning contour on the longitudinal side of the introduction shaft. Only a card correctly shaped at the side edges can therefore be inserted in the lock to release the lock.

Figure 22:
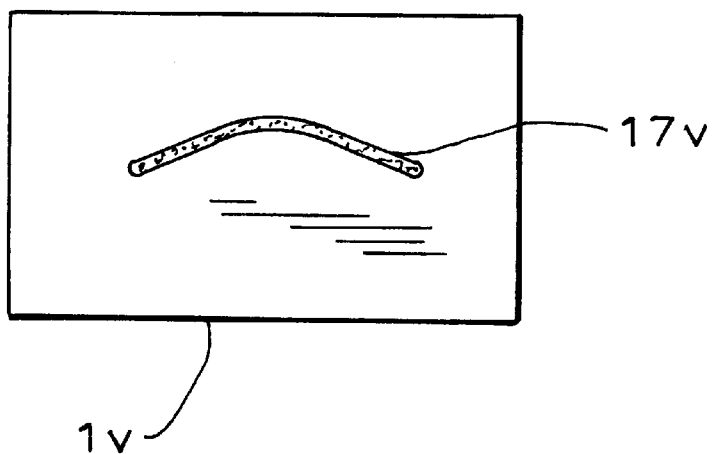
FIG. 22 is an elevational view of a card with an embossed bead on a side face.

One side face of the card 1v shown in FIG. 22 has a bead-shaped raised portion 17v which has a curvature and presses against the trigger member via said curvature, to unlock the coupling member.

The card also has a magnetic strip by which items of information can be stored via a read/write apparatus and/or called up, the apparatus being preferably disposed at the check-out or entrance/exit of a shop. The magnetic strip gives the card further functions; more particularly it can enable items of information concerning the customer, the trolley and/or the goods to be obtained.

The card can have an electronic chip and/or an integrated circuit.

What is claimed is:

1. In combination with at least two carts, a lock system comprising:

a pledge lock on one of said carts;

a locking member of the other of said carts receivable in said pledge lock and releasable therefrom;

a card for operating said pledge lock, said card having along an edge or on a surface thereof at least one recess or at least one projection constituting a formation specific to said card and distinguishing said card from cards free from said formation; and bolt release and card seizure means in said lock operated by said formation upon insertion of said card into said lock for releasing said member and seizing said card and for retaining the seized card until the member associated with the other cart is inserted into said lock.

2. The pledge-lock system defined in claim 1 wherein said formation is at least one chamfer on an edge of said card.

3. The pledge-lock system defined in claim 1 wherein said formation is a number of projections along at least one edge of said card.

4. The pledge-lock system defined in claim 1 wherein said formation is at least one recess provided along at least one edge of said card.

5. The pledge-lock system defined in claim 1 wherein said formation is a row of said formations in the form of teeth provided along an edge of said card.

6. The pledge-lock system defined in claim 1 wherein said formation is a hole in said card.

7. The pledge-lock system defined in claim 1 wherein said formation is a depression formed in a surface of said card.

8. The pledge-lock system defined in claim 1 wherein said formation is a bead-shaped raised portion on a surface of said card.

9. The pledge-lock system defined in claim 1 wherein said card is also provided with a magnetic strip capable of being read.

* * * * *